United States Patent
Okazaki et al.

(10) Patent No.: US 10,406,682 B2
(45) Date of Patent: Sep. 10, 2019

(54) MOTOR OPERATION CONTROL SYSTEM, MULTI-AXIS MECHANICAL APPARATUS, AND MOTOR OPERATION CONTROL METHOD

(71) Applicants: Nidec Corporation, Minami-ku, Kyoto (JP); Nidec Seimitsu Corporation, Ueda-shi, Nagano (JP)

(72) Inventors: Osamu Okazaki, Kyoto (JP); Yuji Tanaka, Ueda (JP)

(73) Assignees: NIDEC CORPORATION, Kyoto (JP); NIDEC SEIMITSU CORPORATION, Nagano (JP)

( * ) Notice: Subject to any disclaimer, the term of this patent is extended or adjusted under 35 U.S.C. 154(b) by 0 days.

(21) Appl. No.: 15/869,775

(22) Filed: Jan. 12, 2018

(65) Prior Publication Data
US 2018/0200883 A1    Jul. 19, 2018

(30) Foreign Application Priority Data

Jan. 13, 2017 (JP) ................... 2017-004111

(51) Int. Cl.
*B25J 9/12* (2006.01)
*B25J 9/06* (2006.01)
(Continued)

(52) U.S. Cl.
CPC . *B25J 9/12* (2013.01); *B25J 9/06* (2013.01); *B25J 9/1674* (2013.01); *G05B 19/4141* (2013.01); *H02P 5/00* (2013.01); *H02P 29/0241* (2016.02); *G05B 2219/50218* (2013.01); *Y10S 901/02* (2013.01); *Y10S 901/23* (2013.01); *Y10S 901/25* (2013.01)

(58) Field of Classification Search
CPC .................. G05B 19/0426; G05B 19/4141; G05B 19/25; B25J 9/1674; B25J 9/06; B25J 9/12; B25J 9/126; H02P 5/74; H02P 5/00; H02P 29/0241; H02P 29/045; H02P 6/16
See application file for complete search history.

(56) References Cited

U.S. PATENT DOCUMENTS 4,825,133 A * 4/1989 Tanuma ................ H02K 37/00
                                                        318/113
6,522,096 B1 * 2/2003 Roth ..................... B25J 9/1602
                                                        310/156.01
(Continued)

FOREIGN PATENT DOCUMENTS

JP    2008-167644 A    7/2008
JP    2011-065152 A    3/2011
(Continued)

*Primary Examiner* — Thai T Dinh
(74) *Attorney, Agent, or Firm* — Keating & Bennett, LLP (57) ABSTRACT

According to an aspect of the invention, a motor operation control system configured to control an operation of a multi-axis mechanical apparatus including motors includes drive control units each of which is provided for one corresponding motor and a central controller configured to output an operation command to the drive control units. Each of the drive control units controls an operation of a motor based on the operation command from the central controller and transmits a response signal to another drive control unit and the central controller through asynchronous serial communication.

8 Claims, 7 Drawing Sheets

(51) Int. Cl.
    *B25J 9/16* (2006.01)
    *H02P 5/00* (2016.01)
    *G05B 19/414* (2006.01)
    *H02P 29/024* (2016.01)

(56) References Cited

U.S. PATENT DOCUMENTS

| | | | | |
|---|---|---|---|---|
| 6,806,660 B2* | 10/2004 | Fujisaki | ............... | H02P 31/00 318/113 |
| 6,943,521 B2* | 9/2005 | Kurokawa | ......... | G05B 19/4141 318/34 |
| 7,923,957 B2* | 4/2011 | Yang | ............... | G05B 19/404 318/111 |
| 9,138,894 B2* | 9/2015 | Alotto | ............... | B25J 9/161 |
| 9,318,895 B2* | 4/2016 | Nagatsuka | ............... | H02P 31/00 |
| 9,855,107 B2* | 1/2018 | Labonville | ............... | A61B 34/30 |
| 10,206,751 B2* | 2/2019 | Labonville | ............... | A61B 34/30 |
| 2011/0062900 A1 | 3/2011 | Shin et al. | | |
| 2014/0081453 A1 | 3/2014 | Alotto | | |
| 2017/0080568 A1* | 3/2017 | Yu | ............... | H02P 5/68 |

FOREIGN PATENT DOCUMENTS

JP    2014-061586 A    4/2014
JP    2015-220849 A    12/2015

\* cited by examiner

MOTOR OPERATION CONTROL SYSTEM, MULTI-AXIS MECHANICAL APPARATUS, AND MOTOR OPERATION CONTROL METHOD

CROSS-REFERENCE TO RELATED APPLICATION

This application claims the benefit of Japanese Patent Application No. 2017-4111 filed on Jan. 13, 2017, which are hereby incorporated by reference herein in its entirety.

BACKGROUND OF THE INVENTION

Field of the Invention

The present invention relates to a motor operation control system, a multi-axis mechanical apparatus, and a motor operation control method.

Description of the Related Art

A control system configured to control an operation of a robot including a plurality of drive units that can be driven independently controls an operation of a drive unit to which a sub control unit provided in each of plurality of drive units corresponds, for example, on the basis of an operation command output from a central controller. In such a control system, in order to perform a predetermined operation in a predetermined time with high precision, high speed communication of the operation command among a plurality of sub control devices can be enabled.

In Japanese Patent Laid-Open No. 2014-61586, an industrial robot in which a central controller and a plurality of sub control devices are connected in series through an Ethernet (registered trademark) line is proposed. The industrial robot including the Ethernet (registered trademark) line transmits an operation command transmitted from the central controller through the Ethernet (registered trademark) line in a bucket relay.

In the robot device described in Japanese Patent Laid-Open No. 2014-61586, high speed communication is made possible through an Ethernet (registered trademark) line. However, an expensive adapter for two network ports is required for the sub control device. On the other hand, when an inexpensive robot device is proposed, it is not possible to include an expensive adapter. Therefore, there is a demand for a motor operation control system including a communication system through which higher speed communication is possible than in the related art even if an inexpensive adapter is included without using a communication network through which high speed communication is possible.

SUMMARY OF THE INVENTION

The present invention provides a motor operation control system including a communication system through which high speed communication is possible even if an expensive adapter is included without using a communication network through which high speed communication is possible, a multi-axis mechanical apparatus, and a motor operation control method.

An exemplary first invention of the present application is a motor operation control system configured to control an operation of a multi-axis mechanical apparatus including a plurality of motors, and including a plurality of drive control units each of which is provided for one corresponding motor and a central controller configured to output an operation command to the plurality of drive control units. One drive control unit among the plurality of drive control units controls an operation of a motor based on the operation command output from the central controller and transmits a response signal to another drive control unit and the central controller through asynchronous serial communication. The plurality of drive control units include at least a first drive control unit and a final drive control unit. The first drive control unit transmits first the response signal to the other drive control unit and the central controller. The final drive control unit transmits the response signal to the central controller after receiving the response signal from any of the plurality of drive control units.

DESCRIPTION OF THE EMBODIMENTS

An exemplary example of the present invention will be described below with reference to the drawings. However, sizes, materials, shapes, and relative arrangements of elements described as examples or shown in the drawings are not limited to the content in which the scope of the present invention is described, which is merely illustrative examples. For example, expressions indicating a relative or absolute arrangement such as "in a certain direction," "following a certain direction," "parallel," "orthogonal," "center," "concentric," "coaxial," etc. represent not only strict arrangements but also states in which a tolerance is provided or relative displacement occurs with an angle and a distance with which the same functions are obtained. For example, expressions indicating that elements are in the same state such as "the same," "equal," or "homogeneous," represent not only strictly the same state but also a state in which a tolerance is provided or there is a difference with which the same functions are obtained. For example, an expression indicating a shape such as a rectangular shape or a cylindrical shape represents not only a shape such as a rectangular shape or a cylindrical shape in a geometrically strict sense, but also a shape including an uneven portion, a chamfered portion, or the like in a range in which the same effects are obtained. In addition, expressions that a component is "comprised," "included," "provided," "had," or "contained" are not exclusive expressions that exclude the presence of other components.

Figure 1:
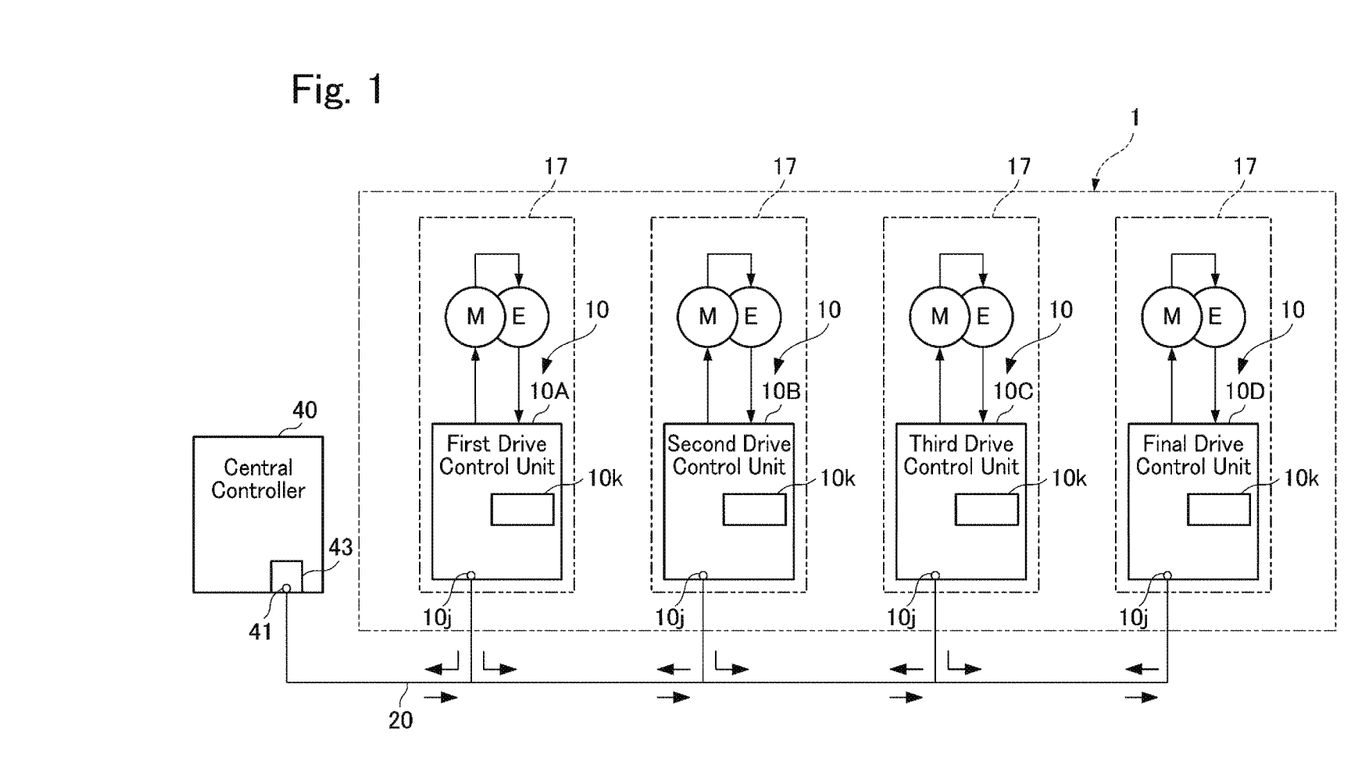
FIG. 1 is a diagram schematically showing a motor operation control system according to an example of the present invention.
Figure 2:
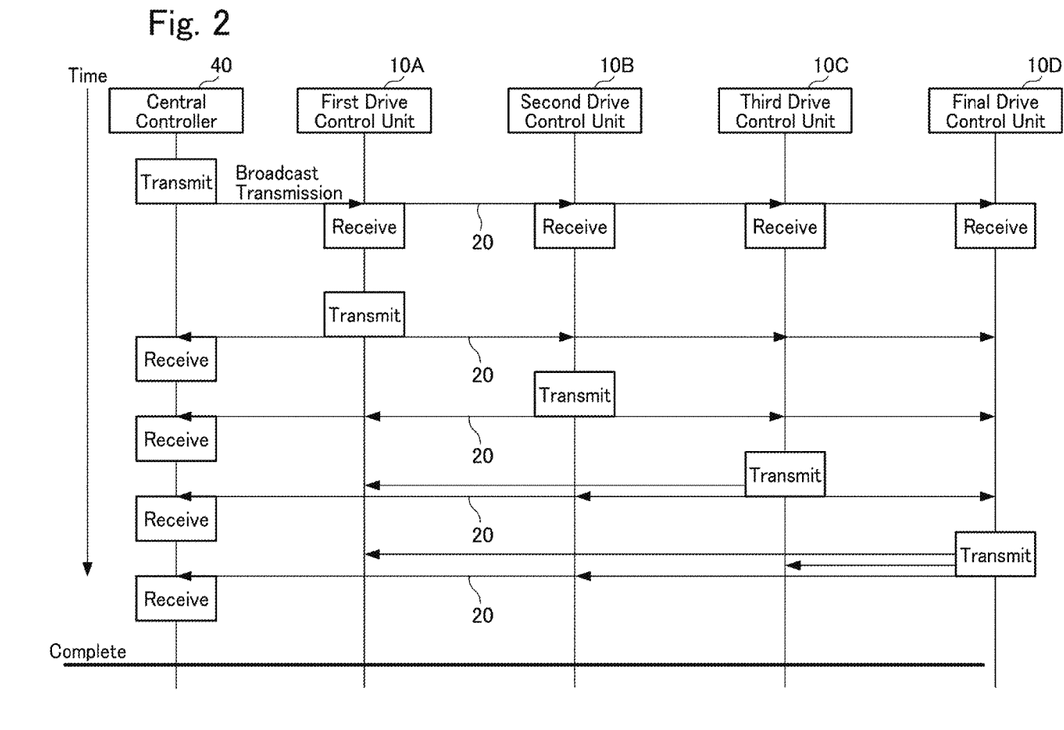
FIG. 2 is an explanatory diagram showing a flow of operation commands and response signals of the motor operation control system according to the example of the present invention.

FIG. 1 is a diagram schematically showing a motor operation control system according to an example of the present invention. FIG. 2 is an explanatory diagram showing a flow of operation commands and response signals of the motor operation control system according to the example of the present invention.

As shown in FIG. 1, the motor operation control system according to the present example is a motor operation control system that controls operations of a multi-axis mechanical apparatus 1 including a plurality of motors M, and includes drive control units 10 each of which is provided for one corresponding motor M, and a central controller 40 configured to output an operation command to the plurality of drive control units 10. The drive control unit 10 controls operations of the motor M based on the operation command output from the central controller 40 and transmits a response signal to another drive control unit 10 and the central controller 40 through asynchronous serial communication. The plurality of drive control units 10 includes at least a first drive control unit 10A and a final drive control unit 10D. The first drive control unit 10A transmits first the response signal to the other drive control unit 10 and the central controller 40. The final drive control unit 10D receives a response signal from any of the plurality of drive control units 10 and then transmits the response signal to the central controller 40.

The multi-axis mechanical apparatus 1 is a mechanical apparatus including a plurality of actuators, and is, for example, a radio control robot, a communication robot, or a robot hand instrument. In the present example, a radio control robot will be exemplified below as the multi-axis mechanical apparatus 1.

In the example shown in FIG. 1, the plurality of motors M of the multi-axis mechanical apparatus 1 each include an encoder E and the drive control unit 10. Thus, the motor M, the encoder E, and the drive control unit 10 are configured as one drive module 17.

The drive control unit 10 processes an operation command output from the central controller 40 and outputs a drive signal to the motor M. In addition, the drive control unit 10 transmits a response signal to another drive control unit 10 and the central controller 40 through asynchronous serial communication. Here, when the drive control unit 10 transmits a response signal through asynchronous serial communication, it is not possible for the other drive control unit 10 and the central controller 40 to transmit a response signal at the same time. However, the drive control unit 10 transmits a response signal to any one of the other drive control units 10 and the central controller 40, and then can transmit a response signal to the other of the other drive control units 10 and the central controller 40. Transmission of a response signal by the drive control unit 10 will be described below in detail.

The encoder E detects a drive amount of the motor M and feeds the detected amount back to the drive control unit 10. Therefore, the drive control unit 10 can adaptively control the motor M on the basis of a detection signal of the encoder E.

A serial port 10j for inputting an operation command and transmitting a response signal is provided in the drive control unit 10. In addition, a universal asynchronous receiver transmitter (UART) 10k is provided in the drive control unit 10. The UART 10k has a function of changing a parallel signal to a serial signal or converting a serial signal into a parallel signal. Therefore, a response signal transmitted from the drive control unit 10 is converted from a parallel signal into a serial signal through the UART 10k and transmitted.

A serial port 41 and a UART 43 for outputting an operation command and inputting a response signal are provided in the central controller 40. The serial port 41 is connected to the UART 43. In the example shown in FIG. 1, a serial cable 20 is connected to the serial port 41 of the central controller 40, the plurality of drive control units 10 are connected to the serial cable 20, and a single bus type connection is formed as the entire drive system. Therefore, operation commands output from the central controller 40 are instantaneously transmitted in a batch to all of the drive control units 10 through broadcast communication toward the plurality of drive control units 10.

In addition, response signals transmitted from the drive control unit 10 are instantaneously transmitted in a batch to the central controller 40 and other drive control units 10 through asynchronous serial communication (the serial cable 20).

In the example shown in FIG. 2, the plurality of drive control units 10 include the first drive control unit 10A, a second drive control unit 10B, a third drive control unit 10C, and the final drive control unit 10D. The first drive control unit 10A transmits first the response signal to another drive control unit 10 and the central controller 40. The final drive control unit 10D receives a response signal from any of the plurality of drive control units 10, and then transmits the response signal to the central controller 40.

Here, since the serial cable 20 is connected to each of the plurality of drive control units 10, a response signal flowing through the serial cable 20 is transmitted to the plurality of drive control units 10. Therefore, any of the plurality of drive control units 10 can receive a response signal. However, when ID data of the drive control unit 10 of a transmission source is included in a response signal and a relationship between ID data of a transmission source and ID data of a reception destination is determined in advance, the response signal can be received by one drive control unit 10.

In the example shown in FIG. 2, the first drive control unit 10A receives an operation command from the central controller 40, and then transmits the response signal to the central controller 40 and the second drive control unit 10B. In addition, the second drive control unit 10B receives a response signal of the first drive control unit 10A and then transmits the response signal to the central controller 40 and the third drive control unit 10C. In addition, the third drive control unit 10C receives a response signal of the second drive control unit 10B and then transmits the response signal to the central controller 40 and the final drive control unit 10D. Moreover, the final drive control unit 10D receives a response signal of the third drive control unit 10C and then transmits the response signal to the central controller 40.

Therefore, the drive control unit 10 of the present example can advance a transmission time of a response signal compared to a case in which a response signal cannot be transmitted if there is no reply request indicating that a response signal is sent from the central controller 40. Therefore, it is possible to shorten a time until the central controller 40 receives response signals from all of the plurality of drive control units 10, that is, it is possible to increase a speed. In addition, serial ports 41 and 10j to which the serial cable 20 is connected are provided in the central controller 40 and each of the plurality of drive control units 10. Therefore, adapters for the serial ports 41 and 10j are less expensive than an adapter to which an Ethernet (registered trademark) line can be connected. Therefore, it is possible to realize a motor operation control system through which high speed communication is possible even if an adapter for an inexpensive serial port is provided without using a communication network through which high speed communication is possible.

Next, modified examples that are obtained by generalizing the above-described example will be described.

As shown in FIG. 2, the plurality of drive control units 10 include the first drive control unit 10A configured to transmit a response signal the first time, an (n−1)th drive control unit 10 configured to transmit a response signal the (n−1)th time (n is a natural number of 2 or more), and the final drive control unit 10D configured to transmit a response signal the nth time. The plurality of drive control units 10 have an order for transmitting response signals. The first drive control unit 10A transmits a response signal to the second drive control unit 10B (n=2) and the central controller 40. The (n−1)th drive control unit 10 receives a response signal transmitted from an (n−2)th drive control unit 10 and then transmits the response signal to the final drive control unit 10D and the central controller 40.

In the example shown in FIG. 2, each of the plurality of drive control units 10 has a determined order when transmitting response signals. That is, the first drive control unit 10A transmits a response signal to the second drive control unit 10B and the central controller 40. The second drive control unit 10B receives the response signal transmitted from the first drive control unit 10A and then transmits the response signal to the third drive control unit 10C and the central controller 40. The third drive control unit 10C receives the response signal transmitted from the second drive control unit 10B and then transmits the response signal to the final drive control unit 10D and the central controller 40. The final drive control unit 10D receives the response signal transmitted from the third drive control unit 10C and then transmits the response signal to the central controller 40.

Figure 3:
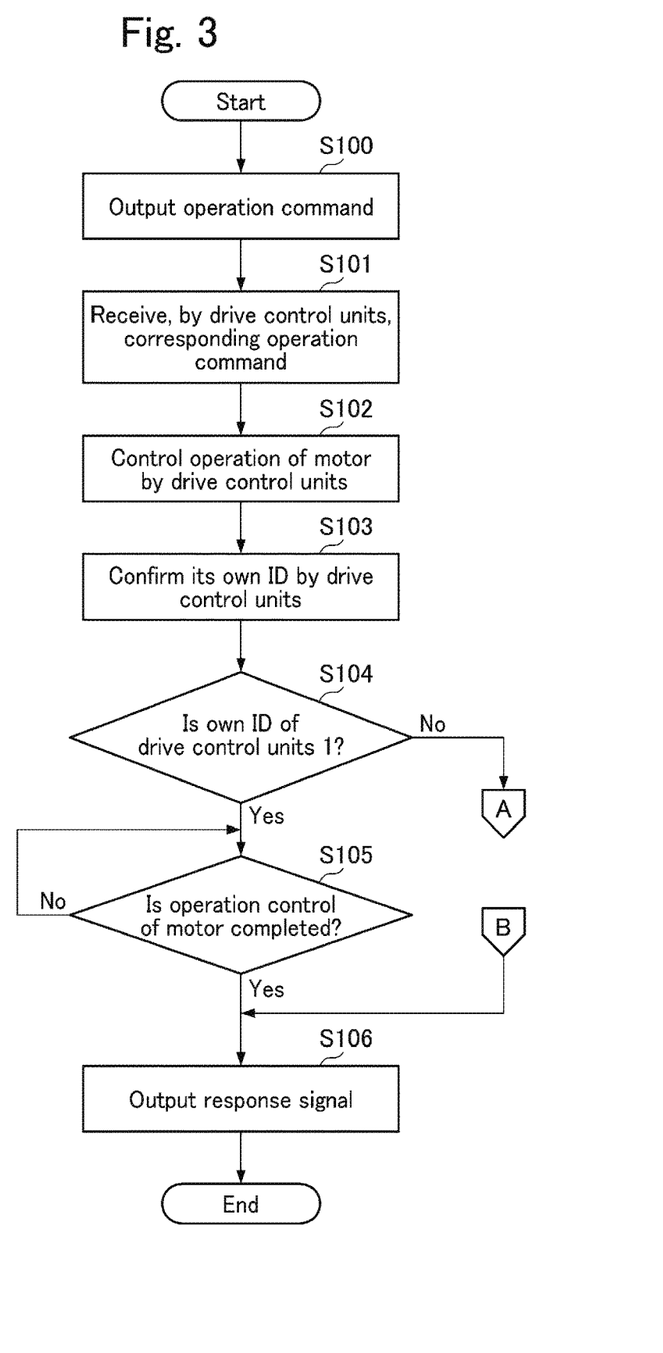
FIG. 3 is a flowchart showing a process of a drive module determining transmitting a response signal.
Figure 4:
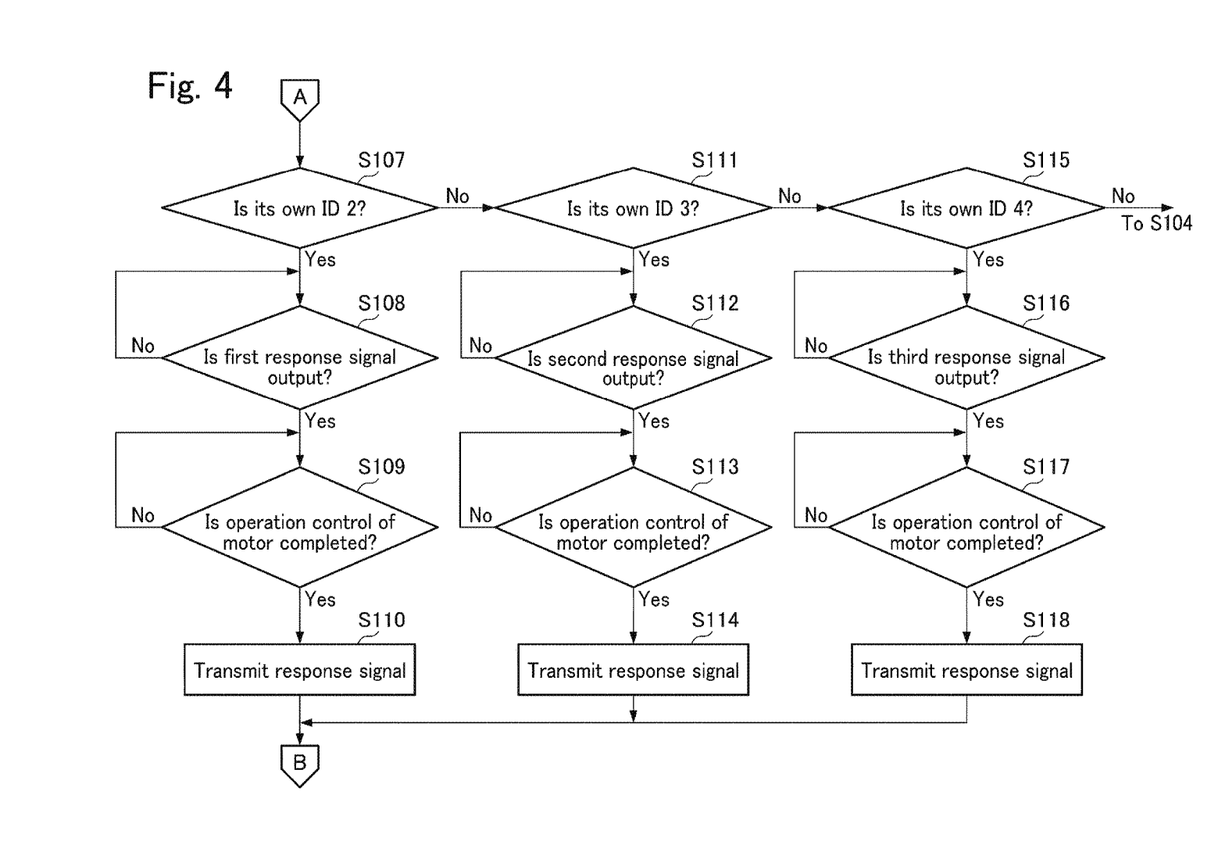
FIG. 4 is a flowchart showing a process of a drive module determining transmitting a response signal.
Figure 5:
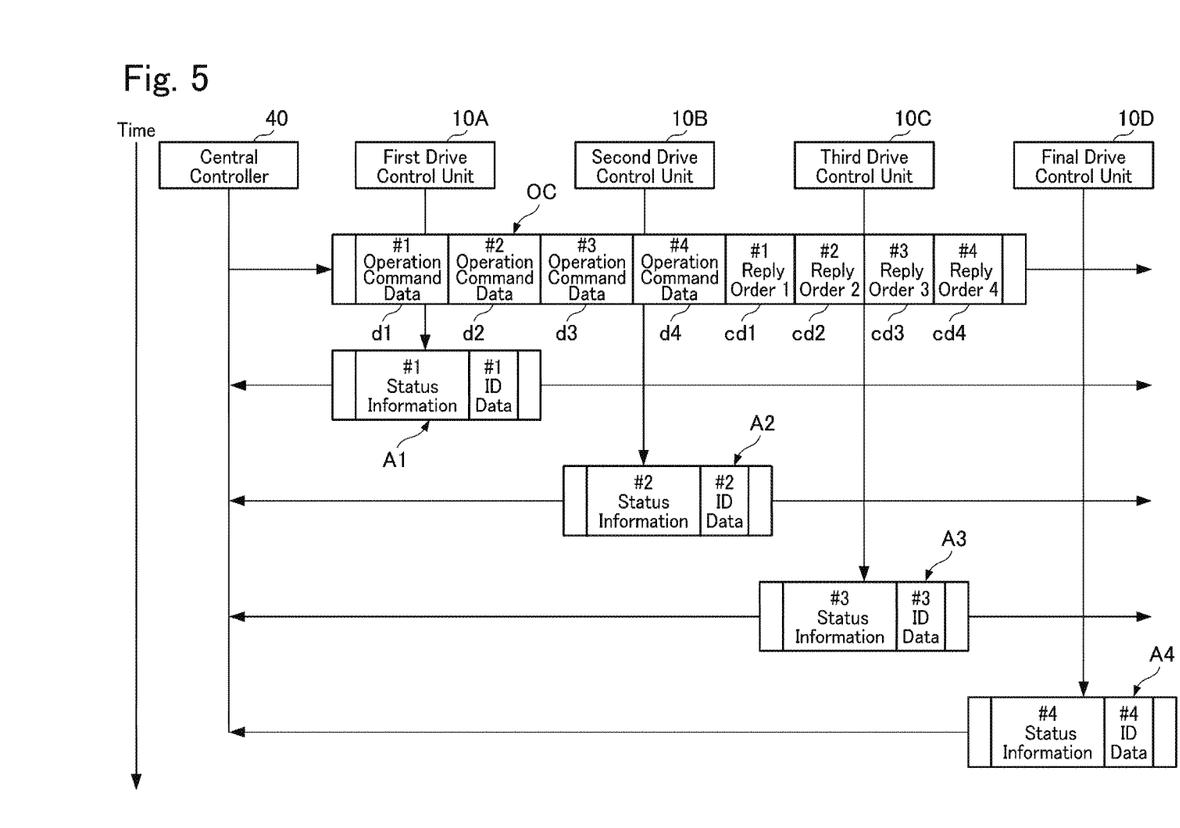
FIG. 5 is an explanatory diagram showing internal structures of packets of an operation command and a response signal according to an example of the present invention.

FIG. 3 and FIG. 4 are flowcharts showing a process of the drive control unit 10 determining transmission of a response signal. FIG. 5 is an explanatory diagram showing internal structures of packets of an operation command and a response signal according to an example of the present invention.

Next, operations of a motor operation control system of a modified example of the example will be described with reference to FIG. 3, FIG. 4, and FIG. 5. As a motor operation control system including the plurality of drive control units 10 (n=1 to n), a motor operation control system in consideration of n=4 of the present invention will be described. That is, the drive control unit 10 (n=1) is the first drive control unit 10A. The drive control unit 10 (n=2) is the second drive control unit 10B. The drive control unit 10 (n=3) is the third drive control unit 10C. The drive control unit 10 (n=4) is the final drive control unit 10D. First, in Step (hereinafter step will be referred to as S) 100, the central controller 40 outputs an operation command OC to each of the plurality of drive control units 10 (n=1 to n) through the serial cable 20. After S100 ends, the process proceeds to S101. In S101, first operation command data d1 corresponding to the first drive control unit 10A (n=1) within the operation command OC is received by the first drive control unit 10A, second operation command data d2 corresponding to the second drive control unit 10B (n=2) is received by the second drive control unit 10B, third operation command data d3 corresponding to the third drive control unit 10C (n=3) is received by the third drive control unit 10C, and final operation command data d4 corresponding to the final drive control unit 10D (n=4) is received by the final drive control unit 10D.

After S101 ends, the process proceeds to S102. In S102, each of the plurality of drive control units 10 (n=1 to n) that have received the operation command OC controls an operation of a corresponding motor M according to the operation command OC. After S102 ends, the process proceeds to S103. In S103, each of the plurality of drive control units 10 (n=1 to n) confirms its own ID. Here, each of the plurality of drive control units 10 (n=1 to n) is given an ID in advance. In the present example, the first drive control unit 10A (n=1) has an ID of 1 and the second drive control unit 10B (n=2) has an ID of 2. In addition, the third drive control unit 10C (n=3) has an ID of 3, and the final drive control unit 10D (n=4) has an ID of 4. Here, the operation control of the motor M in S102 is not limited to rotation control of the motor M. The operation control may be, for example, reading of position information of a rotor of the motor M, a temperature of the motor M, a current amount of the motor M, and the like from a storage area (such as a RAM and a ROM). In addition, the operation control is not limited to simply reading of information in the rotational operation of the motor M, and may be reading of information during stopping.

After S103 ends, the process proceeds to S104. In S104, the first drive control unit 10A (n=1) to the final drive control unit 10D (n=4) determine whether their own ID is 1. In S104, the first drive control unit 10A (n=1) that has confirmed that its own ID is 1 proceeds to S105. In S105, it is determined whether the operation control of the motor M is completed.

In S105, when the first drive control unit 10A (n=1) determines that the operation control of the motor M is completed, the process proceeds to S106. In S106, the first drive control unit 10A (n=1) transmits a first response signal A1 to the central controller 40. Here, S106 includes a process of the first drive control unit 10A (n=1) transmitting the first response signal A1 to the second drive control unit 10B (n=2) in addition to the central controller 40. In this case, the first drive control unit 10A (n=1) transmits the first response signal A1 to the central controller 40 and then transmits it to the second drive control unit 10B (n=2). That is, the first drive control unit 10A transmits a response signal to the second drive control unit 10B (n=2) and the central controller 40.

Thus, in S104, when an ID is not 1, the process proceeds to S107. In S107, each of the second drive control unit 10B (n=2) to the final drive control unit 10D (n=4) determines whether its own ID is 2. In S107, the second drive control unit 10B (n=2) that has confirmed that its own ID is 2 proceeds to S108. In S108, it is determined whether the first response signal A1 has been transmitted from the first drive control unit 10A (n=1). In S108, when the second drive control unit 10B (n=2) receives the first response signal A1 transmitted from the first drive control unit 10A (n=1), the second drive control unit 10B (n=2) determines that the first response signal A1 has been transmitted from the first drive control unit 10A (n=1). When the first response signal A1 is not transmitted from the first drive control unit 10A (n=1), S108 is repeated.

In S108, when the first response signal A1 is transmitted from the first drive control unit 10A (n=1), the process proceeds to S109. In S109, the second drive control unit 10B (n=2) determines whether the operation control of the motor M is completed.

In S109, when the second drive control unit 10B (n=2) determines that the operation control of the motor M is completed, the process proceeds to S110. In S110, the second drive control unit 10B (n=2) transmits a second response signal A2 to the central controller 40. Here, S110 includes a process of the second drive control unit 10B (n=2) transmitting the second response signal A2 to the third drive control unit 10C (n=3) in addition to the central controller 40. In this case, the second drive control unit 10B (n=2) transmits the second response signal A2 to the central controller 40 and then transmits it to the third drive control unit 10C (n=3). In addition, when the operation control of the motor M is not completed, S109 is repeated.

Thus, in S107, when each of the third drive control unit 10C (n=3) and the final drive control unit 10D (n=4) determines that its own ID is not 2, the process proceeds to S111. In S111, each of the third drive control unit 10C (n=3) and the final drive control unit 10D (n=4) confirms whether its own ID is 3. The third drive control unit 10C (n=3) that has confirmed that its own ID is 3 proceeds to S112. In S112, the third drive control unit 10C (n=3) determines whether the second response signal A2 has been transmitted from the second drive control unit 10B (n=2). Here, in S112, when the third drive control unit 10C (n=3) receives the second response signal A2 transmitted from the second drive control unit 10B (n=2), it is determined that the second response signal A2 has been transmitted from the second drive control unit 10B (n=2).

When the second response signal A2 is not transmitted from the second drive control unit 10B (n=2), S112 is repeated. In S112, when the second response signal A2 is transmitted from the second drive control unit 10B (n=2), the process proceeds to S113. In S113, the third drive control unit 10C (n=3) determines whether the operation control of the motor M is completed.

In S113, when the operation control of the motor M is completed, the process proceeds to S114. In S114, the third drive control unit 10C (n=3) transmits a third response signal A3 to the central controller 40. Here, S114 includes a process of the third drive control unit 10C (n=3) transmitting the third response signal A3 to the final drive control unit 10D (n=4) in addition to the central controller 40. In this case, the third drive control unit 10C (n=3) transmits the third response signal A3 to the central controller 40 and then transmits it to the final drive control unit 10D (n=4). On the other hand, when the operation control of the motor M is not completed, S113 is repeated. As shown in S112 to S114, the (n−1)th drive control unit receives the response signal transmitted from the (n−2)th drive control unit and then transmits the response signal to the final drive control unit 10D and the central controller 40. That is, the (n−2)th drive control unit is the second drive control unit 10B. The second drive control unit 10B (the (n−2)th drive control unit) transmits a response signal to the (n−1)th drive control unit. In addition, the (n−1)th drive control unit is the third drive control unit 10C and transmits a response signal to the final drive control unit 10D (the nth drive control unit).

Thus, in S111, when the final drive control unit 10D (n=4) determines that its own ID is not 3, the process proceeds to S115. In S115, the final drive control unit 10D (n=4) confirms whether its own ID is 4. In S115, when the final drive control unit 10D (n=4) confirms that its own ID is 4, the process proceeds to S116. In S116, the final drive control unit 10D (n=4) determines whether the third response signal A3 has been transmitted from the third drive control unit 10C (n=3). Here, in S116, when the third response signal A3 transmitted from the third drive control unit 10C (n=3) is received, the final drive control unit 10D (n=4) determines that the third response signal A3 has been transmitted from the third drive control unit 10C (n=3). When the third response signal A3 is not transmitted from the third drive control unit 10C (n=3), S116 is repeated. In S116, when the third response signal A3 is transmitted from the third drive control unit 10C (n=3), the process proceeds to S117.

In S117, the final drive control unit 10D (n=4) determines whether the operation control of the motor M is completed.

In S117, when the operation control of the motor M is completed, the process proceeds to S118. In S118, the final drive control unit 10D (n=4) transmits a final response signal A4 to the central controller 40. On the other hand, when the operation control of the motor M is not completed, S117 is repeated. Here, in S115, when the final drive control unit 10D (n=4) determines that its own ID is not 4, since it is considered that determination of an ID by the plurality of drive control units 10 is erroneous, the process returns to S104.

In this manner, the central controller 40 can receive response signals from all of the first drive control unit 10A (n=1) to the final drive control unit 10D (n=4).

In this manner, in the modified example of the example of the present invention, the drive control unit 10 can transmit a response signal to the central controller 40 merely when it is confirmed that a response signal of another drive control unit 10 having an ID one before the subject drive control unit 10 is transmitted. Therefore, it is possible to shorten a time until the central controller 40 receives response signals from all of the plurality of drive control units 10, that is, it is possible to increase a speed. In addition, since each of the plurality of drive control units 10 has a determined order when transmitting response signals, the drive control unit 10 can transmit a response signal according to the determined order. Therefore, when the motor operation control system of the modified example is installed in, for example, a radio control robot, it is possible to operate the motor M included in each of the plurality of drive control units 10 according to the determined order for a specific operation of the radio control robot.

Thus, in the above-described S100, as shown in FIG. 5, the operation command OC output from the central controller 40 includes reply order data cd1 to cd4 having a determined order when transmitting response signals to each of the plurality of drive control units 10 (n=1 to 4) and each of the plurality of drive control units 10 (n=1 to 4) may transmit a response signal to another drive control unit 10 and the central controller 40 on the basis of the reply order data cd1 to cd4.

The central controller 40 outputs an operation command OC to the plurality of drive control units 10 (n=1 to 4) and the operation command OC is determined in advance and stored in a RAM or the like provided in the central controller 40. In addition, the central controller 40 modifies the operation command OC on the basis of response signals A1, A2, A3, and A4 transmitted from the plurality of drive control units 10 (n=1 to 4) and outputs the modified command. In this manner, the operation command OC includes an operation command OC for each of the plurality of drive control units 10 (n=1 to 4) and the reply order data cd1 to cd4 of response signals A1 to A4.

In the example shown in FIG. 5, the operation command OC is simultaneously transmitted to all of the plurality of drive control units 10 (n=1 to 4) connected to a bus type communication line through data transmission of one frame. Four operation command data items are written in the operation command OC. Specifically, in the operation command OC, the first operation command data d1 corresponding to the first drive control unit 10A (n=1), the second operation command data d2 corresponding to the second drive control unit 10B (n=2), the third operation command data d3 corresponding to the third drive control unit 10C (n=3), and the final operation command data d4 corresponding to the final drive control unit 10D (n=4) are written. Here, in each of the first operation command data d1 to the final operation command data d4, ID data (#1, #2, #3, #4) for identifying data of any of the four drive control units 10 (n=1 to 4) is included. That is, the first operation command data d1 includes ID data#1. The second operation command data d2 includes ID data#2. The third operation command data d3 includes ID data#3. The final operation command data d4 includes ID data#4.

In addition, regarding a reply order of the response signals A1 to A4, the first reply order data cd1 for the first drive control unit 10A (n=1), the second reply order data cd2 for the second drive control unit 10B (n=2), the third reply order data cd3 for the third drive control unit 10C (n=3), and the fourth reply order data cd4 for the final drive control unit 10D (n=4) are written in the operation command OC. Here, in the reply order data cd1 to cd4, ID data (#1, #2, #3, #4) for identifying a place in the reply order of any of the four drive control units 10 (n=1 to 4) is included. That is, the reply order data cd1 includes ID data#1. The reply order data cd2 includes ID data#2. The reply order data cd3 includes ID data#3. The reply order data cd4 includes ID data#4.

On the other hand, the response signals A1 to A4 are transmitted to the central controller 40 and one the drive control units 10 connected to a serial communication line through data transmission of one frame. In the example shown in FIG. 5, the first response signal A1 from the first drive control unit 10A (n=1) includes information about determination of the operation control by the first drive control unit 10A (n=1), that is, status information about operation information described in the above-described S105 and ID data indicating that there is a reply from the first drive control unit 10A (n=1). The second response signal A2, the third response signal A3, and the final response signal A4 of the second drive control unit 10B (n=2) to the final drive control unit 10D (n=4) have content according to the first drive control unit 10A (n=1).

In the example shown in FIG. 5, when the operation control of the motor M based on the operation command OC is completed, the first drive control unit 10A (n=1) transmits the first response signal A1 to the central controller 40 and then transmits the first response signal A1 to the second drive control unit 10B (n=2). In addition, after the first response signal A1 is received, the second drive control unit 10B (n=2) transmits the second response signal A2 to the central controller 40 and then transmits the second response signal A2 to the third drive control unit 10C (n=3). In addition, after the second response signal A2 is received, the third drive control unit 10C (n=3) transmits the third response signal A3 from the third drive control unit 10C (n=3) to the central controller 40 and then transmits the third response signal A3 to the final drive control unit 10D (n=4). In addition, after the third response signal A3 is received, the final drive control unit 10D (n=4) transmits the final response signal A4 from the final drive control unit 10D (n=4) to the central controller 40.

In this manner, the operation command OC includes the reply order data cd having a determined order when transmitting response signals to each of the plurality of drive control units 10 (n=1 to 4). Therefore, when any of the plurality of drive control units 10 (n=2 to 4) confirms that a response signal of one place earlier in the order than its own place has been transmitted, it is possible to easily determine a time at which the subject drive control unit 10 transmits a response signal.

Figure 6:
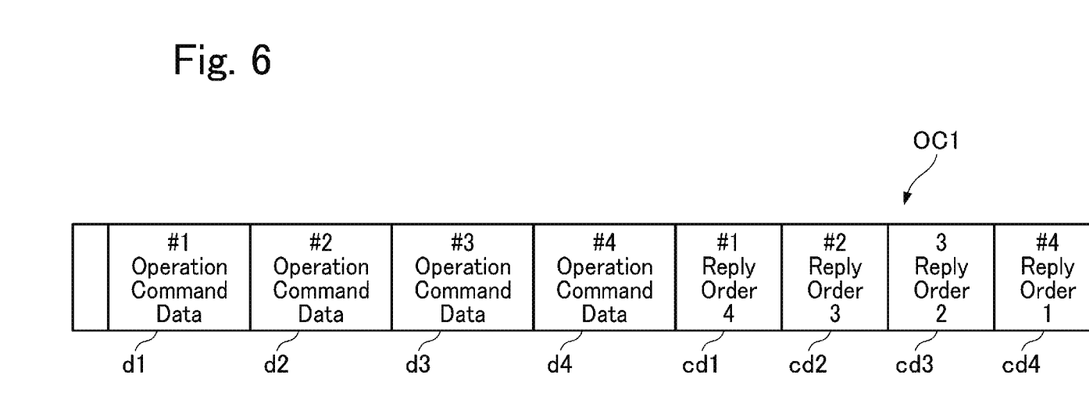
FIG. 6 is an explanatory diagram showing an internal structure of a packet of an operation command according to a modified example of the example of the present invention.
Figure 7:
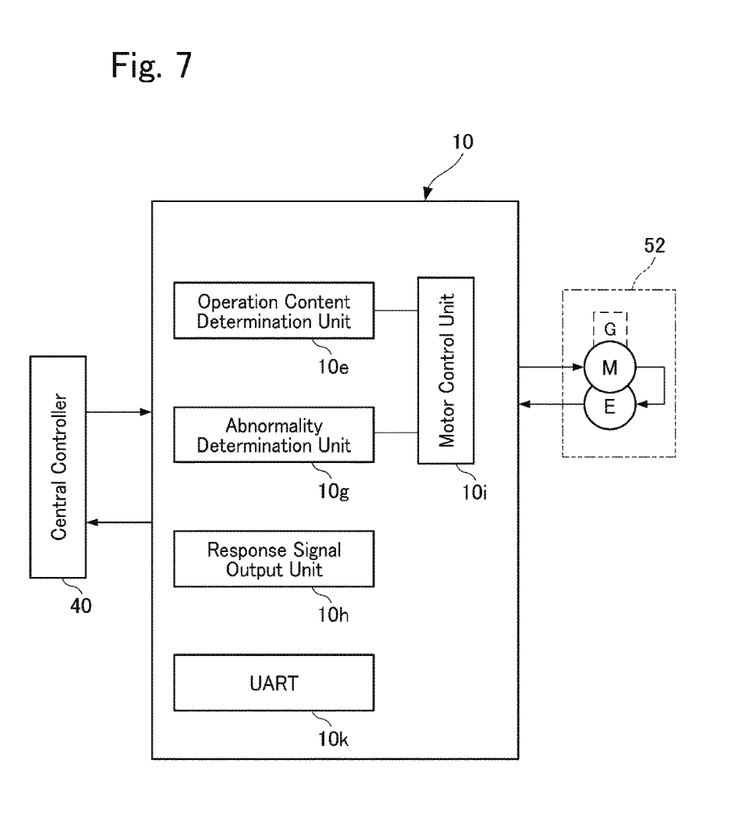
FIG. 7 is a block diagram showing a structure of a drive control unit.

FIG. 6 is an explanatory diagram showing an internal structure of a packet of an operation command OC according to a modified example of the example of the present invention. FIG. 7 is a block diagram showing a structure of the drive control unit 10.

In addition, in the example described in FIG. 6, the operation command OC may include a reply order change operation command OC1 including reply order data in which a transmission order of response signals of content different from the order determined in the reply order data described in the above-described FIG. 5 is determined. In addition, as shown in FIG. 7, each of the plurality of drive control units 10 (n=1 to 4) may further include an operation content determination unit 10e configured to determine whether the operation command OC is the reply order change operation command OC1. When the operation content determination unit 10e determines that the operation command OC is the reply order change operation command OC1, each of the plurality of drive control units 10 (n=1 to 4) transmits a response signal to other drive control units 10 and the central controller 40 according to the order determined in the reply order change operation command OC1.

Here, only parts of the reply order change operation command OC1 of the present example that are different from the above-described operation command OC shown in FIG. 5 will be described and parts the same as those in the operation command OC shown in FIG. 5 will be denoted by the same reference numerals and descriptions thereof will be omitted.

As shown in FIG. 6, regarding a reply order of response signals, the reply order change operation command OC1 includes the first reply order data cd4 for the final drive control unit 10D (n=4), the second reply order data cd3 for the third drive control unit 10C (n=3), the third reply order data cd2 for the second drive control unit 10B (n=2), and the fourth reply order data cd1 for the first drive control unit 10A (n=1). Here, in the reply order data cd, ID data (#1, #2, #3, #4) for identifying a place in the reply order of any of the four drive control units 10 is included.

In this manner, in the reply order change operation command OC1, a transmission order of response signals of content different from the order determined in the reply order data shown in FIG. 5 is determined. Therefore, the reply order of the response signals of the plurality of drive control units 10 (n=1 to 4) can be changed by the reply order change operation command OC1.

As shown in FIG. 7, the plurality of drive control units 10 (n=1 to 4) may include the operation content determination unit 10e, an abnormality determination unit 10g, a response signal output unit 10h, the motor control unit 10i, and the UART 10k. The operation content determination unit 10e determines whether the operation command OC is the reply order change operation command OC1.

As described above, the reply order change operation command OC1 includes the reply order data cd in which a transmission order of response signals of content different from the order determined in the reply order data cd is determined. Here, the "order determined in the reply order data cd" refers to an order described in an operation command in which a reply order different from a reply order described in a current operation command OC is described among operation commands OC transmitted from the central controller 40 before the current operation command. Therefore, the operation command OC in which the "order determined in the reply order data cd" is described is, for example, any of an operation command that is transmitted first from the central controller 40 and an operation command output from the central controller 40 between the first operation command and the current operation command.

The motor control unit 10*i* performs conversion into a signal for operating the motor M according to the operation command OC output from the central controller 40. The response signal output unit 10*h* determines and outputs content of the response signal. The UART 10*k* converts the response signal (parallel signal) transmitted from the response signal output unit 10*h* into a serial signal and converts the operation command OC (serial signal) output from the central controller 40 into a parallel signal. The abnormality determination unit 10*g* will be described below.

According to such an example, when the operation command OC is the reply order change operation command OC1 including reply order data in which a transmission order of response signals of content different from the order determined in the reply order data cd is determined, the operation content determination unit 10*e* determines that the operation command OC is the reply order change operation command OC1. The motor control unit 10*i* changes the reply order of the response signals of the drive control units 10 on the basis of the reply order change operation command OC1. Therefore, for example, when the central controller 40 outputs the reply order change operation command OC1 according to operation content of the radio control robot, it is possible to change the reply order of the response signals of the drive control units 10.

In addition, as shown in FIG. 7, each of the plurality of drive control units 10 (n=1 to 4) may further include the abnormality determination unit 10*g* configured to determine whether an operation state of the motor M whose operation is controlled by the drive control unit 10 is abnormal. The drive control unit 10 of which the abnormality determination unit 10*g* determines that the motor M is abnormal transmits a response signal in which abnormality of the motor M is described to the central controller 40. When the response signal in which abnormality of the motor M is described is received, the central controller 40 outputs an operation command OC for resolving an abnormal state of the motor M to the drive control unit 10 configured to control an operation of the motor M. Then, the drive control unit 10 that has received the operation command controls the operation of the motor M in an abnormal state on the basis of the operation command OC and resolves the abnormal state of the motor M.

When the motor M whose operation is controlled by the drive control unit 10 operates, for example, if the radio control robot comes in contact with an obstacle or the like, the motor M is brought into an abnormal state in which a driving speed slows or becomes zero. In this case, when the drive control unit 10 cannot transmit a response signal to the central controller 40, it is not possible for the central controller 40 to ascertain the abnormal state of the motor M.

However, in the present example, when the abnormality determination unit 10*g* determines that the motor M is abnormal, the drive control unit 10 transmits a response signal in which abnormality of the motor M is described to the central controller 40. In the example shown in FIG. 8, when the abnormality determination unit 10*g* determines that the motor M is abnormal, the response signal output unit 10*h* converts the response signal in which abnormality of the motor M is described into a serial signal in the UART 10*k* and then transmits it to the central controller 40. Therefore, the central controller 40 can quickly recognize the abnormal state of the radio control robot.

Thus, as shown in FIG. 8, each of the plurality of motors M includes a gear unit G.

When the gear unit G in which a rotational speed of the motor M is reduced is connected to the motor M, it is possible to increase an output torque of the motor M. On the other hand, in a direct drive method in which the motor M and an arm of the radio control robot or the like are directly connected and the motor is driven, it is not possible to increase an output torque. In this manner, when each of the plurality of motors M includes the gear unit G, it is possible to increase an output torque. Therefore, the motor M including the gear unit G can be applied to the multi-axis mechanical apparatus 1 that requires a larger torque than a torque at which the motor can be driven in the direct drive method.

In addition, the multi-axis mechanical apparatus 1 including the motor operation control system of the above-described example may be used.

The multi-axis mechanical apparatus 1 is a mechanical apparatus including a plurality of actuators and, for example, is a radio control robot, a communication robot, or a robot hand instrument. When such a multi-axis mechanical apparatus 1 includes the above-described motor operation control system, it is possible to realize the multi-axis mechanical apparatus 1 through which high speed communication is possible even if an adapter for an inexpensive serial port is provided without using a communication network through which high speed communication is possible.

In addition, when an order of outputting a response signal to each of the plurality of drive control units 10 (n=1 to 4) is determined, the multi-axis mechanical apparatus 1 can operate the motor M included in each of the plurality of drive control units 10 (n=1 to 4) according to the determined order for a specific operation of the multi-axis mechanical apparatus 1.

In addition, when reply order data in which an order of transmitting response signals to each of the plurality of drive control units 10 (n=1 to 4) is determined is included in the operation command OC, the drive control unit 10 of the multi-axis mechanical apparatus 1 can confirm a response signal transmitted from the drive control unit 10 that is one place before in the order than the subject drive control unit 10. Therefore, the drive control unit 10 of the multi-axis mechanical apparatus 1 can easily determine a time at which a response signal is transmitted.

Moreover, when the operation command OC is the reply order change operation command OC1 including reply order data in which a transmission order of response signals of content different from the order determined in the reply order data is determined, the drive control unit 10 can change the reply order of the response signal of the drive control unit 10 on the basis of the reply order change operation command OC1. Therefore, it is possible to change the reply order of the response signals of the drive control units 10 according to operation content of the multi-axis mechanical apparatus 1.

In addition, when the multi-axis mechanical apparatus 1 includes the abnormality determination unit 10*g* configured to determine whether the operation state of the motor M is abnormal, the central controller 40 can quickly recognize the abnormal state of the multi-axis mechanical apparatus 1.

In addition, when the motor M includes the gear unit G, the motor M including the gear unit G can be applied to the multi-axis mechanical apparatus 1 that requires a larger torque than a torque at which the motor can be driven in the direct drive method.

Next, a motor operation control method of a modified example of the example described above will be described. As shown in FIG. 1 and FIG. 2, the motor operation control method is a motor operation control method of a motor operation control system including drive control units 10 each of which is provided for one corresponding motor M and the central controller 40 configured to output an operation command OC to the plurality of drive control units 10 and configured to control an operation of the plurality of motors M. The drive control unit 10 controls operations of the motor M based on the operation command OC output from the central controller 40 and transmits a response signal to another drive control unit 10 and the central controller 40 through asynchronous serial communication. The plurality of drive control units 10 include at least the first drive control unit 10A and the final drive control unit 10D. The motor operation control method includes a first response signal transmission process of the first drive control unit 10A transmitting first a response signal to another drive control unit 10 and the central controller 40 and a second response signal transmission process of the final drive control unit 10D receiving a response signal from any of the plurality of drive control units 10 and then transmitting the response signal to the central controller 40.

The content of the motor operation control method of the modified example of the example is the same as that described with reference to FIG. 3 and FIG. 4, detailed descriptions thereof will be omitted and only expressions different from those among content described with reference to FIG. 3 and FIG. 4 will be described. The first response signal transmission process corresponds to S106 shown in FIG. 3. The second response signal transmission process corresponds to S118 shown in FIG. 4

In such a modified example of the example, in the first response signal transmission process, the first drive control unit 10A transmits first the response signal to another drive control unit 10 and the central controller 40. In addition, in the second response signal transmission process, the final drive control unit 10D receives a response signal from any of the plurality of drive control units 10, and then transmits the response signal to the central controller 40. Therefore, in the motor operation control method of the present example, it is possible to advance a transmission time of a response signal compared to a case in which a response signal cannot be transmitted if there is no reply request indicating that a response signal is sent from the central controller 40. Therefore, it is possible to shorten a time until the central controller 40 receives response signals from all of the plurality of drive control units 10, that is, it is possible to increase a speed. In addition, the central controller 40 and the plurality of drive control units 10 transmit and receive signals through asynchronous serial communication. Therefore, serial ports 41 and 10j to which the serial cable 20 is connected are provided in the central controller 40 and each of the plurality of drive control units 10. Adapters for the serial ports 41 and 10j are less expensive than an adapter to which an Ethernet (registered trademark) line can be connected. Therefore, it is possible to realize a motor operation control method through which high speed communication is possible even if an adapter for an inexpensive serial port is provided without using a communication network through which high speed communication is possible.

While exemplary examples of the present invention have been described above, the present invention is not limited to the above examples, and various modifications can be made without departing from the spirit and scope to the present invention.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. A motor operation control system configured to control an operation of a multi-axis mechanical apparatus including a plurality of motors, the system comprising:
    a plurality of drive control units each of which is provided for one corresponding motor; and
    a central controller configured to output an operation command to the plurality of drive control units, wherein
    one drive control unit among the plurality of drive control units controls an operation of a motor of the plurality of motors based on the operation command output from the central controller and transmits a response signal to another drive control unit and the central controller through asynchronous serial communication,
    the plurality of drive control units include at least a first drive control unit and a final drive control unit,
    the first drive control unit transmits first the response signal to the other drive control unit and the central controller,
    the final drive control unit transmits the response signal to the central controller after receiving the response signal from any of the plurality of drive control units, and
    each one of the plurality of drive control units individually transmits a response signal corresponding to a certain single one of the plurality of motors to the central controller, the response signal including data associated solely to respective with the certain single one of the plurality of motors.

2. The motor operation control system according to claim 1,
    wherein the plurality of drive control units include the first drive control unit configured to transmit first the response signal, an (n−1)th drive control unit configured to transmit the response signal the (n−1)th time (n is a natural number of 2 or more), and the final drive control unit configured to transmit the response signal the nth time,
    the plurality of drive control units have an order of transmitting the response signals,
    the first drive control unit transmits the response signal to a second drive control unit (n=2) and the central controller, and
    the (n−1)th drive control unit transmits the response signal to the final drive control unit and the central controller after receiving the response signal transmitted from the (n−2)th drive control unit.

3. The motor operation control system according to claim 1,
    wherein the operation command includes reply order data in which an order of transmitting the response signal to each of the plurality of drive control units is determined, and
    each of the plurality of drive control units transmits the response signal to the other drive control unit and the central controller on the basis of the reply order data.

4. The motor operation control system according to claim 3,
    wherein the operation command includes a reply order change operation command including reply order data in which a transmission order of the response signals of content different from the order determined in the reply order data is determined, each of the plurality of drive control units further includes an operation content determination unit configured to determine whether the operation command is the reply order change operation command, and each of the plurality of drive control units transmits the response signal to the other drive control unit and the central controller according to the order determined in the reply order change operation command, when the operation content determination unit determines that the operation command is the reply order change operation command.

5. The motor operation control system according to claim 1, wherein each of the plurality of drive control units further includes an abnormality determination unit configured to determine whether an operation state of a motor whose operation is controlled by the drive control unit is abnormal, a drive control unit of which the abnormality determination unit determines that the motor is abnormal transmits a response signal in which abnormality of the motor is described to the central controller, the central controller transmits an operation command for resolving an abnormal state of the motor to the drive control unit configured to control an operation of the motor, when the response signal in which abnormality of the motor is described is received, and the drive control unit receiving the operation command resolves the abnormal state of the motor by controlling an operation of the motor in an abnormal state on the basis of the operation command.

6. The motor operation control system according to claim 1, wherein each of the plurality of motors includes a gear unit.

7. A multi-axis mechanical apparatus comprising the motor operation control system according to claim 1.

8. A motor operation control method of a motor operation control system which includes a plurality of drive control units each of which is provided for one corresponding motor of a plurality of motors and a central controller configured to output an operation command to the plurality of drive control units and configured to control an operation of the plurality of motors, one drive control unit among the plurality of drive control units controls an operation of a motor based on the operation command output from the central controller and transmits a response signal to another drive control unit and the central controller through asynchronous serial communication, and the plurality of drive control units include at least a first drive control unit and a final drive control unit, the motor operation control method comprising:

a first response signal transmission step in which the first drive control unit transmits first the response signal to the other drive control unit and the central controller; and a second response signal transmission step in which the final drive control unit transmits the response signal to the central controller after receiving a response signal from any of the plurality of drive control units; wherein each one of the plurality of drive control units individually transmits a response signal corresponding to a certain single one of the plurality of motors to the central controller, the response signal including data associated solely to respective with the certain single one of the plurality of motors.

\* \* \* \* \*